A. RAHN.
CURRYCOMB.
APPLICATION FILED JULY 21, 1909.
962,666.
Patented June 28, 1910.
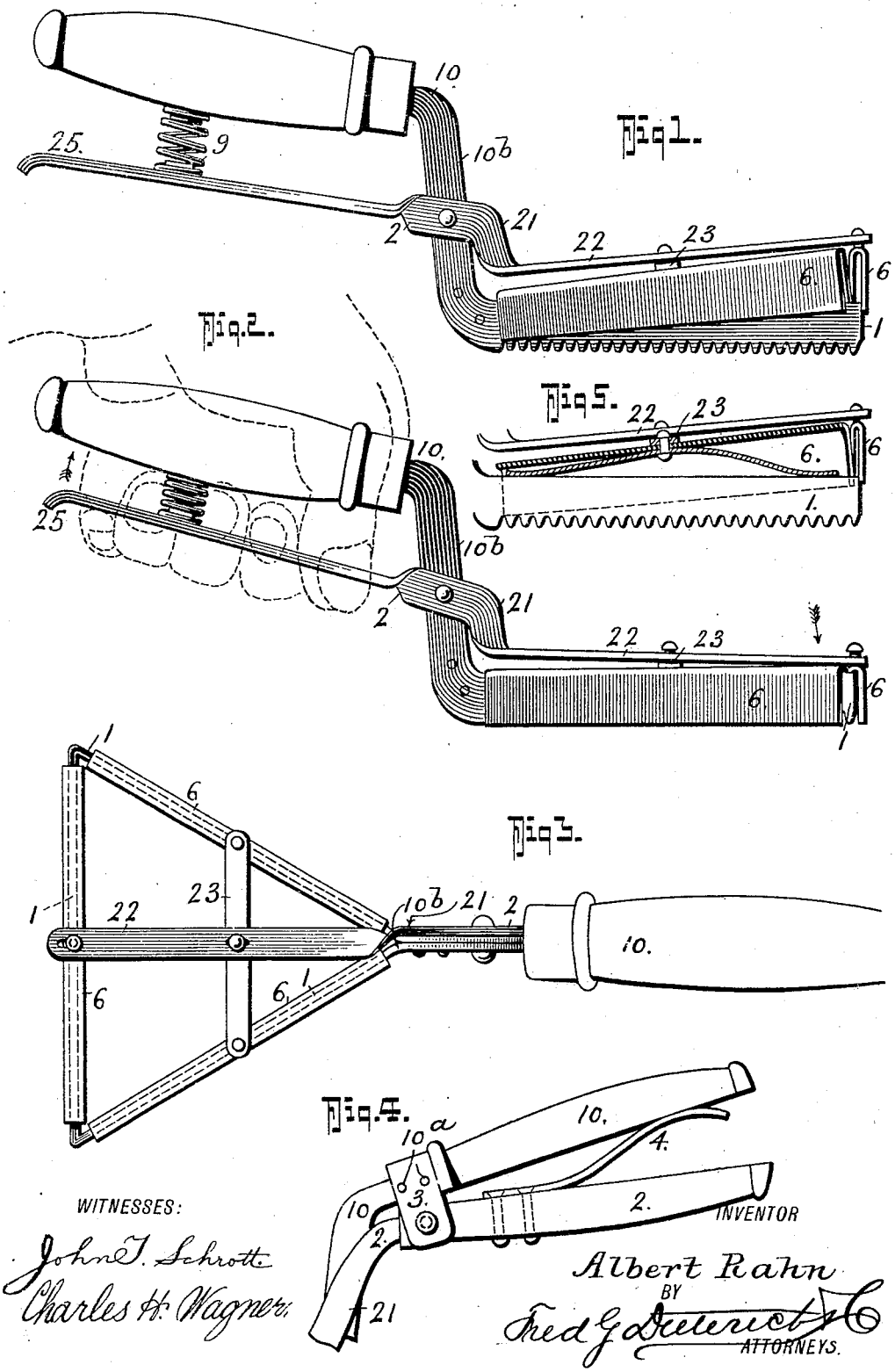

UNITED STATES PATENT OFFICE.

ALBERT RAHN, OF NEUSTADT, ONTARIO, CANADA.

CURRYCOMB.

962,666.  Specification of Letters Patent.  Patented June 28, 1910.

Application filed July 21, 1909. Serial No. 508,717.

*To all whom it may concern:*

Be it known that I, ALBERT RAHN, a subject of the King of England, residing at Neustadt, in the Province of Ontario, Canada, have invented a new and Improved Currycomb, of which the following is a specification.

This invention relates generally to that type of curry combs having teeth cleaning devices, and it more specially has for its object to provide a new and simple construction and arrangement of parts, wherein cleaner devices are included that under ordinary use are held up out of their cleaning position and which under an extra pressure on the curry comb handle are brought into action to simultaneously clean all of the teeth of the comb.

In its more detailed nature, my invention consists of certain details of construction and peculiar combination of parts, all of which will be hereinafter fully pointed out in the appended claims and illustrated in the accompanying drawings in which—

Figure 1, is a side elevation of a curry comb constructed in accordance with my invention, the cleaner devices being at the upper or normal position. Fig. 2, is a similar view, the cleaner devices being down to the comb cleaning position. Fig. 3, is a top plan view. Fig. 4, is a side elevation that shows a modified arrangement of the handle members. Fig. 5, is a detail section of one of the cleaners and a spring device connected directly therewith for holding it up from the toothed member 1.

In carrying out my invention, I provide the curry frame or head, which may be and preferably is, of a triangular shape, and consists of the toothed members 1—1—1 formed of a bar bent to shape, said bar being an extension of a handle section 10 that opposes the other half handle 2, when the two part handle shown in Fig. 4 is used, pivotally mounted between strap links 3, between which the said member 10 is also fulcrumed, as at 10ᵃ.

4 designates a stout spring that is interposed between the handle sections and serves to normally separate the said section as shown.

By referring now more particularly to Fig. 1 it will be noticed the tang portions of the two half handles cross each other and the member 10 bends down from the handle portion substantially at right angles, as at 10ᵇ, and is then bent at right angles again in a plane parallel with the handles, its extension being bent to the triangular shape with its outer end brought back and riveted or otherwise made fast to the part 10ᵇ. The other handle member 2 has its tang portion bent down at right angles as at 21 and thence outwardly as at 22 in substantially horizontal plane parallel with the tooth bars and disposed above the said bars as is best shown in Figs. 1 and 3 which also show that the said horizontal portion 22 is provided with a cross member 23 integral or otherwise made fast thereto.

6—6 designates the cleaner devices, in the nature of inverted U shaped caps each preferably bent up from a single piece, that straddle the upper edges of the tooth bars and are normally held with their lower edges just above the teeth on the said members. The several caps 6 are fixedly secured on the outer end of the portion 22 of the handle member 20 and then to the outer ends of the cross member 23—23, the several parts being so arranged that as the handle members are tightly pressed together, the several caps 6—6 will be simultaneously moved down over the toothed or combing edges and thereby instantly clean them, it being obvious that on release of a tight grip on the handle members, the caps 6—6 assume their normal uppermost position.

Instead of forming the handle in two-half sections with an interposed spring, the handle proper may be a solid member as shown in Fig. 1 and the member 20 formed with a supplemental handle 25 that projects in line with the main handle to be readily gripped by the fingers, when desired, the spring 9 in this instance being located between the main and supplemental handles as shown.

Instead of using the spring between the handles for freeing the caps from the toothed edges of the comb, a spring may be located between each cap and the upper edge of the respective bars on which the caps seat as shown in Fig. 5.

From the foregoing taken in connection with the accompanying drawings, the complete arrangement and the advantages of my invention will be readily apparent.

The several parts can be economically made and assembled and in practice the operator uses the same in the ordinary way for combing and when he wishes to clean the comb only needs to apply extra pressure to the handle members to cause all of the cleaners to quickly clean the teeth.

I am aware that curry combs having cleaners adapted to slide down over the teeth under leverage pressure have been heretofore provided, but so far as I know, their construction has been more or less complicated and expensive and the cleaners have required special thumb or finger lever controlled action to clean the teeth.

My invention differentiates from what has heretofore been provided in the special coöperative form and arrangement of the two handle members and the manner in which the cleaner caps are mounted with respect to the said members and the toothed bars.

Having thus described my invention, what I claim and desire to secure by Letters Patent is:—

1. A curry comb comprising a strap metal member bent into triangular form and provided with toothed edges, said strap metal member having an upwardly bent handle portion and a handle section secured thereto, a plurality of U-shaped cleaning plates fitted over said triangular portions, strap metal members connecting said U-shaped plates and having a portion bent to form a second handle portion, means pivotally connecting said handle portions, and means for holding said U-shaped plates out of alinement with the serrated or toothed edge of said triangularly bent member.

2. A curry comb consisting of a member formed of a single piece of strap metal bent into triangular form and having its lower edges toothed, said strap metal member having an upwardly bent handle forming portion, a second strap metal member pivoted to said handle forming portion, a plurality of U-shaped cleaning plates fitted over said triangularly bent portions, means connecting one of said cleaning plates with said second strap metal member, a bar connecting the other cleaning plates together, and to said strap metal member, and resilient means for moving said cleaning plates out of engagement with the toothed edges of said first mentioned strap metal member.

ALBERT RAHN.

Witnesses:
JOSEPHINE SEEBER,
MAUDE SEEBER.